May 17, 1927.
A. C. FISCHER
1,629,267
OUTLET BOX CONNECTION
Filed Nov. 28, 1923
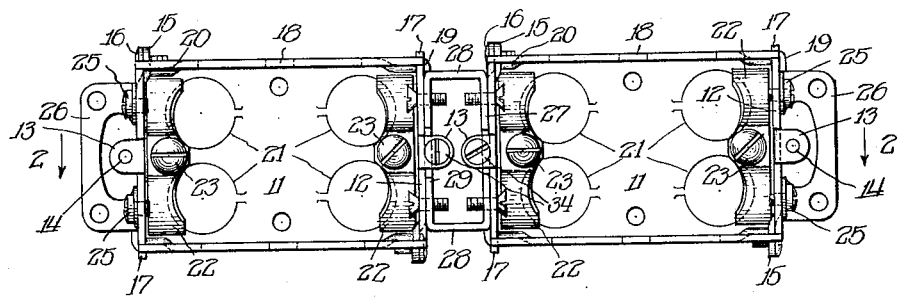
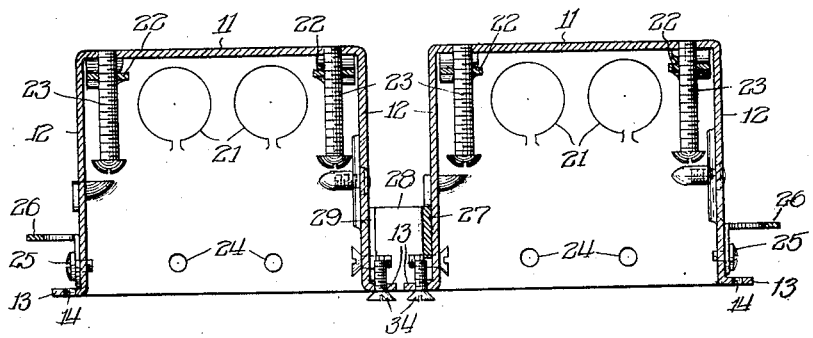
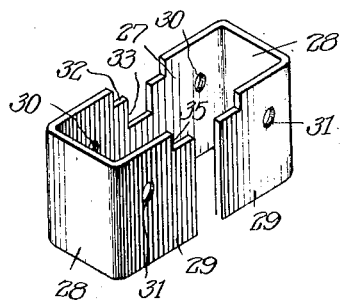
Witness:
R. Burkhardt
Inventor:
Albert C. Fischer,
By Wilkinson Huxley Byron & Knight
Attys Patented May 17, 1927.

1,629,267

UNITED STATES PATENT OFFICE.

ALBERT C. FISCHER, OF CHICAGO, ILLINOIS, ASSIGNOR TO ROACH-APPLETON MANUFACTURING COMPANY, OF CHICAGO, ILLINOIS, A CORPORATION OF ILLINOIS.

OUTLET-BOX CONNECTION.

Application filed November 28, 1923. Serial No. 677,543.

This invention relates to a new and improved outlet box connecter and more specifically to a connecter adapted to connect in tandem a pair of standard outlet boxes without the necessity of modification of the boxes.

Outlet boxes used in connection with electrical conduits have been standardized in form and construction so that a single type and design of box is adapted for a wide variety of uses and is adapted to receive conduits entering any of its sides or its bottom. These boxes are formed of sheet metal and are provided upon their sides and ends at points adjacent their open faces with threaded openings adapted to receive screws to secure attaching lugs to the boxes. These lugs serve to attach the boxes in place in walls by being also attached to adjacent woodwork or studding.

The boxes are also provided with ears bent down and extending in line longitudinally from their ends. These ears are provided with threaded openings adapted to receive screws for securing face plates to the boxes and for securing switches or the like within the boxes.

These boxes are provided with standard means connecting their sides to the member forming the bottom and ends in such manner that the sides may be removed from two boxes and the boxes joined to form a single double box. In some situations, however, where the available wall space is narrow and it is desired to install a plurality of outlets or switches, it is desirable to attach or place the boxes end to end or in tandem relation. The boxes do not adapt themselves for such connection without additional connecting means.

It is an object of the present invention to provide an outlet box connection adapted to connect boxes in tandem relation without modification of the boxes.

It is a further object to provide a connecter of this character which may be cheaply and rapidly constructed and which may be easily connected to the boxes to secure two boxes together in a rigid unit.

Other and further objects will appear as the description proceeds.

I have illustrated a preferred embodiment of my invention in the accompanying drawings, in which—

Figure 1 is a face view of a pair of outlet boxes secured together by my improved connecter;

Figure 2 is a section taken on line 2—2 of Figure 1; and

Figure 3 is a perspective view of a connecter unit.

The boxes themselves form no part of the present invention.

These boxes comprise the bottom portions 11 to which are integrally connected the end portions 12. These end portions are provided with the ears 13 having the threaded openings 14 therein. Each end is provided at one side with an extension 15 having a threaded opening receiving a screw 16, and at its other side is provided with a lug 17.

As clearly shown in Figure 1, the lugs 17 and extensions 15 upon opposite ends of the box are diagonally opposite each other. The side members 18 are provided upon one end with hook lugs 19 and upon the other end with the depressed portions 20 adapted to receive the screws 16. The sides, ends and bottoms are also provided with punched openings 21 which may be knocked out to permit the entry of the end of a conduit. The conduit clamps 22 are provided which are adjustably secured in place by means of screws 23.

At points adjacent the open edge of the box the sides and ends are provided with threaded openings 24 adapted to receive the screws 25 which secure the attaching lugs to the box. The spacing between the openings 24 upon each side and end of the box is standard so that a single size of lug 26 may be used upon either side or end of the box or both sides and ends.

The connecter which comprises the present invention as clearly shown in Figure 3 comprises a strip of metal bent in approximately rectangular form. This metal strip has a central portion 27 and the portions 28 bent at right angles thereto and the end portions 29 bent back parallel to the portion 27. The portion 27 is provided with the threaded openings 30 which are spaced to correspond to the spacing of the openings 24 in the outlet boxes. The end portions 29 are provided with openings 31 which are similarly spaced.

The portion 27 is cut away at 32 to provide clearance for an ear 13 and at 33 to provide clearance for a face plate screw 34. The ends of the portion 29 are cut away at 35 to provide clearance for an ear 13 and are spaced apart an amount sufficient to provide clearance for a screw 34.

The method of using the connecter is clearly shown in Figures 1 and 2. It is placed between the adjacent ends of the boxes and screws are passed through the registering holes 24 and 30, and 24 and 31. The two boxes are rigidly held in tandem relation. No modification of the standard box is required and the connecter does not extend laterally beyond the boxes so that they may be fitted in any space wide enough to accommodate the boxes alone.

While the particular utility of the connecter is in connecting boxes in tandem, it will be apparent that it may be used to connect boxes side by side if such a relation should be desired.

I claim:

1. In combination with a pair of outlet boxes having threaded openings in their sides adapted to receive screws for securing attaching lugs thereto, a connecter comprising a metal strip bent to form an approximately rectangular member having parallel faces adapted to engage the adjacent faces of the outlet boxes and having threaded openings adapted to register with the lug attaching threaded openings in the boxes to receive screws to secure the connecter to the boxes.

2. In combination with a pair of outlet boxes having threaded openings in their sides adapted to receive screws for securing attaching lugs thereto, ears extending longitudinally from the ends of the boxes having threaded openings adapted to receive face plate securing screws, a connecter comprising a metal strip bent to form an approximately rectangular member having parallel sides adapted to engage the adjacent faces of the outlet boxes and threaded openings adapted to register with the lug attaching threaded openings in the boxes to receive screws to secure the connecter to the boxes, the connecter being cut away to provide clearance for the box end ears and face plate securing screws.

Signed at Chicago, Illinois, this 16 day of Nov., 1923.

ALBERT C. FISCHER.